United States Patent
Mueller (10) Patent No.: US 6,368,373 B1
(45) Date of Patent: Apr. 9, 2002

(54) AIR AND LIQUID SEPARATOR FOR A CARPET EXTRACTOR

(75) Inventor: David G. Mueller, North Canton, OH (US)

(73) Assignee: The Hoover Company, North Canton, OH (US)

( * ) Notice: Subject to any disclaimer, the term of this patent is extended or adjusted under 35 U.S.C. 154(b) by 0 days.

(21) Appl. No.: 09/587,029

(22) Filed: Jun. 2, 2000

Related U.S. Application Data (60) Provisional application No. 60/137,563, filed on Jun. 4, 1999.

(51) Int. Cl.[7] .............................. B01D 45/08; A47L 9/10
(52) U.S. Cl. .................... 55/443; 55/444; 55/DIG. 3; 15/350; 15/353
(58) Field of Search ............... 55/443, 444, DIG. 3; 15/350, 353

(56) References Cited

U.S. PATENT DOCUMENTS

| | | | |
|---|---|---|---|
| 1,416,215 A | 5/1922 | Kirkup | |
| 2,605,857 A | 8/1952 | Smellie | 183/35 |
| 2,635,277 A | 4/1953 | Belknap | 15/322 |
| 3,002,214 A | 10/1961 | Krammes | 15/320 |
| 3,048,039 A * | 8/1962 | Hackler | 55/444 |
| 3,165,774 A | 1/1965 | Barba | 15/323 |
| 4,864,680 A | 9/1989 | Blase et al. | 15/321 |
| 4,920,608 A | 5/1990 | Hult et al. | 15/339 |
| 5,319,828 A | 6/1994 | Waldhauser et al. | 15/320 |
| 5,500,976 A | 3/1996 | Rohrbacher et al. | 15/320 |
| 5,615,448 A * | 4/1997 | Crouser et al. | 15/321 |
| 5,779,744 A * | 7/1998 | Mueller et al. | 15/353 |

FOREIGN PATENT DOCUMENTS

| | | |
|---|---|---|
| FR | 2745169 A1 | 8/1997 |
| GB | 2035786 | 6/1980 |

* cited by examiner

*Primary Examiner*—Robert A. Hopkins
(74) *Attorney, Agent, or Firm*—A. Burgess Lowe; Brett A. Schenck (57) ABSTRACT

An air/liquid separator is disclosed that is formed by a recovery tank having a hollow, preferably transparent, removable lid on a recovery tank of a wet pickup suction cleaner. The lid has a wall therein dividing the lid into an inlet/separating chamber and an exit chamber. Liquid and dirt entrained working air enters the inlet chamber and flows horizontally across the inlet chamber over a discharge opening passing through the lid bottom plate, such that the stream of dirty liquid and air is redirected downward through the discharge openings into the recovery tank by a pair of ribs in the inlet chamber. The exit chamber fluidly communicates with the interior of the recovery tank through an exit opening passing through the lid bottom plate. A vacuum is preferably drawn upon the exit chamber by an electric fan for providing the required working air flow through the combined air/liquid separator.

26 Claims, 4 Drawing Sheets

AIR AND LIQUID SEPARATOR FOR A CARPET EXTRACTOR

REFERENCE TO PROVISIONAL APPLICATION

This application claims the benefit of U.S. Provisional Application No. 60/137,563 filed on Jun. 4, 1999.

BACKGROUND OF THE INVENTION

1. Field of the Invention

The present invention pertains to an air and liquid separator particularly useful in an extraction type carpet cleaner.

2. Summary of the Prior Art

Carpet extractors generally spray or otherwise deposit, a cleaning liquid, such as water or a suitable cleaning solution, upon the carpet or other surface to be cleaned, followed by removal of the deposited liquid, along with dirt entrained in the liquid, by a suction nozzle. The soiled liquid and other debris is then separated from the working air and collected in a recovery tank.

Figure 1:
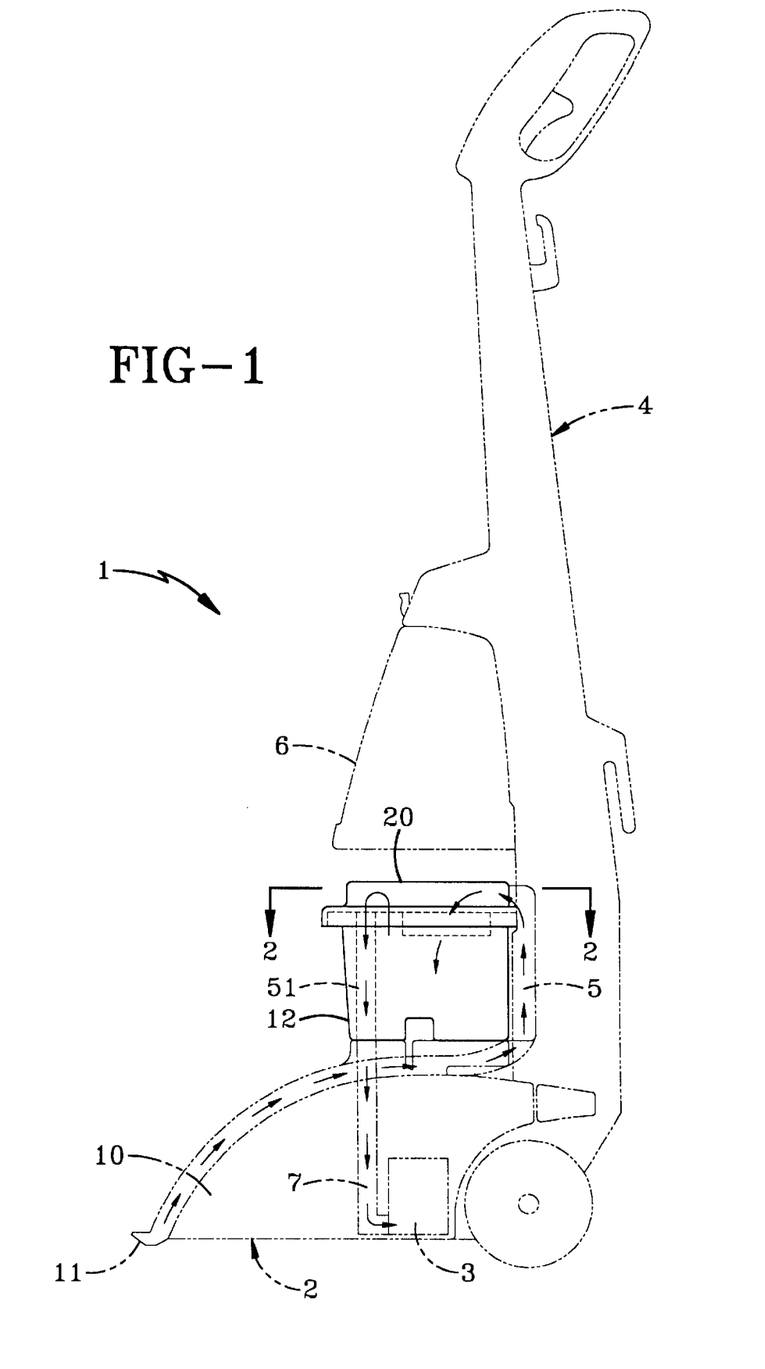
FIG. 1 is a pictorial side view of an upright carpet extractor having a recovery tank including a lid incorporating an air and liquid separator according to the present invention.

Satisfactory separation of liquid and debris from the working air is difficult to obtain in upright style carpet extractors, such as the extractor diagrammatically illustrated in FIG. 1. Unlike canister type carpet extractors and wet/dry utility vacuum cleaners that have a relatively large recovery tank or canister portion, the space available in an upright carpet extractor for the separation and recovery of liquid entrained in the working air is relatively small. In the relatively large recovery tanks provided in canister style wet pickup suction cleaners, the liquid laden working air experiences a large degree of expansion and slowing upon entering the tank. This expansion and slowing of the working air is typically sufficient to adequately separate the liquid from the working air. In the relatively small spaced provided in the recovery tank of an upright carpet extractor, the liquid laden working air travels through the recovery tank much too fast with too little expansion for the liquid to adequately separate from the air, unless special structure is provided in the tank to cause the liquid to separate from the air. Tortuous air flow paths in the recovery tank or in an associated separator are typically used to enhance separation of the entrained liquid and dirt from the working air.

Commonly owned U.S. Pat. No. 5,500,977 and No. 5,779,744 both disclose a recovery tank on an upright carpet extractor. The lid on the recovery tank in each of these patens is hollow and defines an inlet chamber and an outlet chamber that communicate with the recovery tank. The inlet chamber in the lid, combined with the tank itself, forms a separator for separating liquid and other debris from the liquid laden air traveling through the lid and through the recovery tank and collecting the separated liquid and debris in the tank. The 5,500,977 patent teaches a relatively large circular discharge opening in a lower wall of the lid communicating the inlet chamber with the interior of the recovery tank. In the '977 device, the liquid laden air performs a ninety degree turn upon entering the inlet chamber, a ninety degree turn traveling through the inlet chamber, and a ninety degree upon passing through the discharge opening and into the recovery tank. The '744 patent discloses a plurality of relatively small discharge openings in the lower wall of the lid. The liquid laden air travels sequentially over the plurality of discharge openings, with a portion of the air passing through each opening into the recovery tank.

The separator/recovery tanks provided on prior upright carpet extractors perform adequately on the carpet extractors for which they were designed. However, it is desirable to increase the ability of the machine to extract soiled liquid from a carpet. The machines ability to extract liquid from a carpet is most readily increased by increasing the rate of airflow through the suction nozzle. Increasing the airflow through the nozzle increases the airflow through the separator/recovery tank. The result is an increase in the speed at which the liquid laden working air travels through the recovery tank lid and through the recovery tank itself. The prior art recovery tanks and lids are unable to adequately separate the liquid from the working air at the desired increased flow rates. When the flow rate through the nozzle and the separator was increased to the desired level using the existing separators, liquid passed through the recovery tank and entered the motor fan assembly, creating a potentially hazardous situation.

It is also desirable to provide a carpet extractor having a wider nozzle for cleaning a wider swath of carpet in a single pass. In order to maintain the ability of the machine to extract liquid from the carpet using a wider suction nozzle, the rate of airflow must be increased due to the increased size of the nozzle. As described above, the existing separators are unable to satisfactorily separate liquid and other debris from the working air when the rate of airflow through the separator is increased.

SUMMARY OF THE INVENTION

An object of the present invention is to provide an improved air and water separator for use with wet pickup floor care appliances. More particularly, it is an object of the present invention to provide a separator for an upright carpet extractor having enhanced air and water separation, in order to enable an increased rate of air flow through the separator compared to existing upright carpet extractors.

The foregoing and other objects of the present invention, that will be readily apparent from the following description and the attached drawings, are achieved in a preferred embodiment of the present invention by providing an air/liquid separator for use on a wet pickup suction cleaner and more specifically for use on an extractor having an upright configuration as illustrated in FIG. 1. In an upright extractor it is preferred that the recovery tank and air/liquid separator be combined into one removable assembly for ease of emptying the recovered cleaning solution. It is further desirable that the separator incorporate means whereby the operator may visually observe the flow of extracted liquid recovered by the extractor.

In one form or preferred embodiment of the present invention, the recovery tank is provided with a hollow, preferably transparent, removable lid having a wall therein dividing the lid into two separate chambers, an inlet/separating chamber and an exit chamber. Liquid and dirt laden working air preferably vertically enters an inlet opening to the inlet chamber, immediately negotiates a ninety degree turn to the horizontal, and flows horizontally across the inlet chamber over an elongate discharge opening in the lid bottom plate. The stream of dirty liquid and air is redirected downward through the discharge opening into the recovery tank. The incoming liquid and dirt entrained working air thus experiences a tortuous turn, and an expansion immediately upon entering the inlet chamber, followed by a second tortuous turn downward through the lid discharge openings. The liquid laden air undergoes further expansion and deceleration upon entering the recovery tank, where final separation of the liquid and entrained dirt from the working air occurs.

In a preferred embodiment of the present invention, a plurality of ribs are located in the inlet chamber in the lid progressively along the stream of liquid and air entering and flowing across the inlet chamber. First and second ribs extend down from the lid top plate into the inlet chamber. The first and second ribs extend approximately half the distance between the lid top plate and the lid bottom plate. The liquid laden air impinges on the first and second ribs and is at least partially redirected down into the recovery tank. The first and second ribs are also preferably inclined relative to stream of air in the inlet chamber, whereby the first and second ribs force the remaining air traveling through the inlet chamber through a twisting zig-zag pattern.

The exit chamber also fluidly communicates with the interior of the recovery tank through an exit opening passing through the lid bottom plate. A vacuum is preferably drawn upon the exit chamber by the extractor suction fan, thereby providing the required working air flow into and out of the combined air/liquid separator and recovery tank.

BRIEF DESCRIPTION OF THE DRAWINGS

The invention will now be described, by way of example, with reference to the accompanying drawing, of which.

DETAILED DESCRIPTION OF THE INVENTION

In one form or preferred embodiment of the present invention, the air and liquid separator is formed by a hollow lid 20 that is removably mounted on the top of an open top recovery tank 12. The recovery tank is configured to removably set atop a base frame 2 of an upright carpet extractor 1, as diagrammatically illustrated in FIG. 1. The base frame 2 includes two laterally displaced wheels suitably attached to the rear of the frame and a suction motor/fan assembly 3 (diagrammatically illustrated in ghost in FIG. 1) in fluid communication with the recovery tank by way of a suction duct 7. A hood assembly 10, incorporating a floor nozzle 11, is attached to a top portion of the base frame assembly 2. A suction duct 5 fluidly communicates the floor nozzle with the lid of the recovery tank. Pivotally attached to the base frame assembly 2 is a handle assembly 4. Removably supported upon the handle assembly 4 is a cleaning solution supply tank 6.

Upright extractor 1 is used for illustrative purposes only. It will be appreciated that an air and liquid separator according to the present invention may be used with other types of extractors, for example, canister type extractors, with wet/dry utility vacuum cleaners or with any other type of wet pickup suction cleaner. As such, FIG. 1 and the accompanying description are not intended to limit the air and liquid separator according to the present invention to use in combination with an upright extractor as illustrated and described herein. The structure and operation of the upright extractor 1 do not form a part of the present invention and are therefore not described in detail below. A detailed description of the structure and operation of an upright extractor as illustrated in FIG. 1 can be found in co-owned U.S. Pat. No. 5,500,977, issued on Mar. 26, 1996, the description of which is hereby incorporated herein as of reference, and in commonly owned U.S. patent application Ser. No. 08/870,804.

Figure 2:
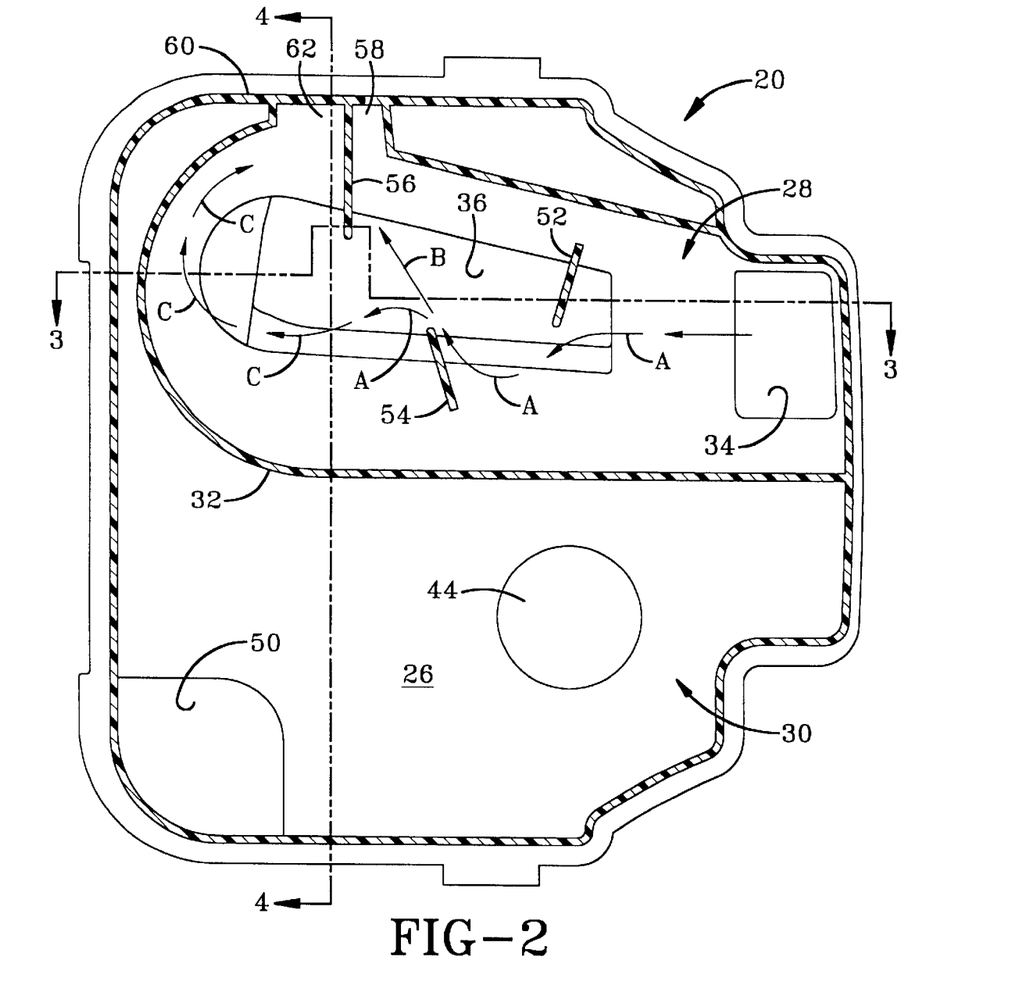
FIG. 2 is a cross-section of the air and liquid separator according to the present invention taken along line 2—2 in FIG. 1.
Figure 3:
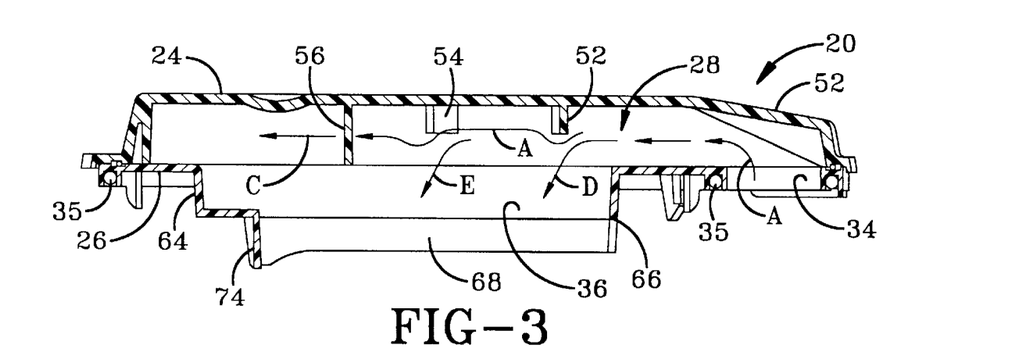
FIG. 3 is a cross section of the lid taken along line 3—3 in FIG. 2.
Figure 4:
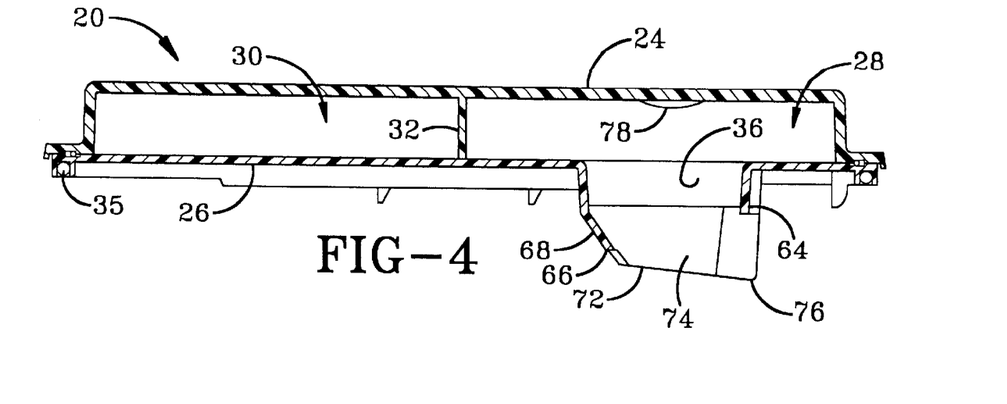
FIG. 4 is a cross-section of the air and liquid separator taken along line 4—4 in FIG. 2.

The top of the recovery tank 12 is selectively enclosed and sealed by the combined separator and recovery tank lid 20. As best seen in FIGS. 2 through 4, the lid 20 comprises a top plate 24 and a bottom plate 26 sealingly welded or otherwise adhered together forming a plenum there between. The plenum is divided by a dividing wall 32 into two separate and distinct chambers, an inlet or separating chamber 28 and an exit chamber 30. The dividing wall 32 is preferably integrally molded into one of the lid top plate and lid bottom plate and extends between the lid top plate 24 and the lid bottom plate 26.

The separating chamber 28 fluidly communicates through an inlet opening 34 in the bottom plate 26 with the suction duct 5 (diagrammatically illustrated in ghost in FIG. 1) that communicates with the floor nozzle 11. Any suitable sealing means, such as a gasket 35, may be used between the suction duct 5 and the inlet opening 34. All gaskets identified herein are preferably made from closed cell extruded cellular rubber or a foamed in place rubber gaskets. The suction duct 5 is preferably integrally molded into the recovery tank 12. An elongate discharge opening 36 in the lid bottom plate 26 provides fluid communication between the tank 12 and the inlet chamber 28. Similarly, the exit chamber 30 includes an exit opening 44 passing through the bottom plate 26, providing fluid communication between the tank 12 and the exit chamber 30. It is preferable to provide a conventional shut-off float within a float cage (not shown) to choke off the flow of working air through the exit opening 44 when the reclaimed fluid within recovery tank 12 reaches a desire, maximum level.

The exit chamber 30 further includes an exhaust or outlet opening 50. An exhaust duct 51 (diagrammatically illustrated in ghost in FIG. 1) is preferably integrally molded into the tank 12. When the recovery tank is mounted to the extractor, the exhaust duct communicates the outlet opening 50 in the lid with the motor fan assembly via the air duct 7 (diagrammatically illustrated in ghost in FIG. 1) located in the base frame assembly. The lid assembly is removably mounted to the tank 12 by any suitable releasable latching means (not shown). Any suitable sealing means, such as the gasket 35, may be used to seal the lid upon the top of the recovery tank.

In operation, as diagrammatically illustrated by dashed arrows in FIG. 1, the inlet of the suction motor fan assembly 3 fluidly communicates with the recovery tank 12 via the air duct 7, the exhaust duct 51 and the exit chamber 30 (see FIG. 2), thereby drawing air form the recovery tank and creating a partial vacuum within the tank. As diagrammatically illustrated by solid arrows in FIG. 1, the vacuum in the recovery tank causes working air, including entrained liquid and soil, to be extracted from the carpet and drawn in through the floor nozzle 11, the suction duct 5, the separating chamber 28 (see FIG. 2) and into the recovery tank 12.

Referring now to FIGS. 2 and 3, the working air and entrained liquid enters the separating chamber 28 through the inlet opening 34, is deflected by an inclined portion 52 of the top plate 24 and flows horizontally through the separating chamber 28, as indicated by arrows A in FIGS. 2 and 3. First 52, second 54 and third 56 ribs extend down from the lid top plate 24 into the inlet chamber. The first second and third ribs are arranged progressively along the stream A of air and liquid, such that the stream A of air and liquid exiting the inlet opening 34 sequentially impinges upon the first, second and third ribs.

As best seen in FIG. 2, the first 52 and second 54 ribs are inclined relative the incoming stream A of air and liquid, such that the flow of air and liquid through the recovery tank is at least partially forced into a twisting, zig-zag path through the inlet chamber. Forcing the air and liquid to travel in a twisting zig-zag path slows the liquid laden air traveling through the lid, and thereby provides more time for liquid to precipitate out of the air. Forcing the air through repeated turns also facilitates separation of liquid from the air, due to the higher inertial weight of the liquid relative to the air. As discussed above, when the liquid laden air is forced through a sharp curve, the relatively lighter air is able to negotiate the turn, whereas the relatively heavier liquid cannot negotiate the turn and tends to continue in a straight path and separates from the air. A portion of the stream A is forced to perform a little dip, i.e flow down a little and turn abruptly back up again, when traveling past the first 52 and second 54 ribs as illustrated in FIG. 3. When the liquid laden air turns abruptly back up, some of the relatively heavy liquid entrained in the air is caused to drop out of the stream A and settle in the tank.

The second rib is located and oriented to direct at least a portion of the liquid laden air, illustrated by arrow B in FIG. 2, into a corner 58 formed by the third rib 56 and a peripheral wall of the inlet chamber. The portion B of liquid laden air traveling through the inlet chamber slams into the corner 58, causing the liquid laden air to stall allowing liquid to drop out of the air. A remaining portion of the liquid laden air travels past all three ribs, as illustrated by arrows C, and is redirected by the dividing wall 32, such portion C of the air traveling through the inlet chamber reverses direction and impinges the opposite surface of the third rib 56. Portion C of the air stream thus slams into a corner 62 defined between the third rib and the peripheral wall of the inlet chamber, causing the liquid laden air to stall allowing liquid to drop out of the air.

Referring now to FIG. 3, as the stream A of air and entrained liquid passes over the discharge opening 36, a portion of the air is deflected by the first 52 and second 54 ribs downward through the discharge opening 36, as illustrated by arrows D and E. Due to the greater inertial weight of the liquid relative to the air, most of the liquid continues to flow with the remaining air substantially horizontally through the inlet chamber, as illustrated by arrows A. Deflection of portions D and E of the air through the discharge opening 36, causes the remaining stream A of air and liquid in the inlet chamber to expand and slow, thereby further enhancing separation of liquid from the air.

Figure 5:
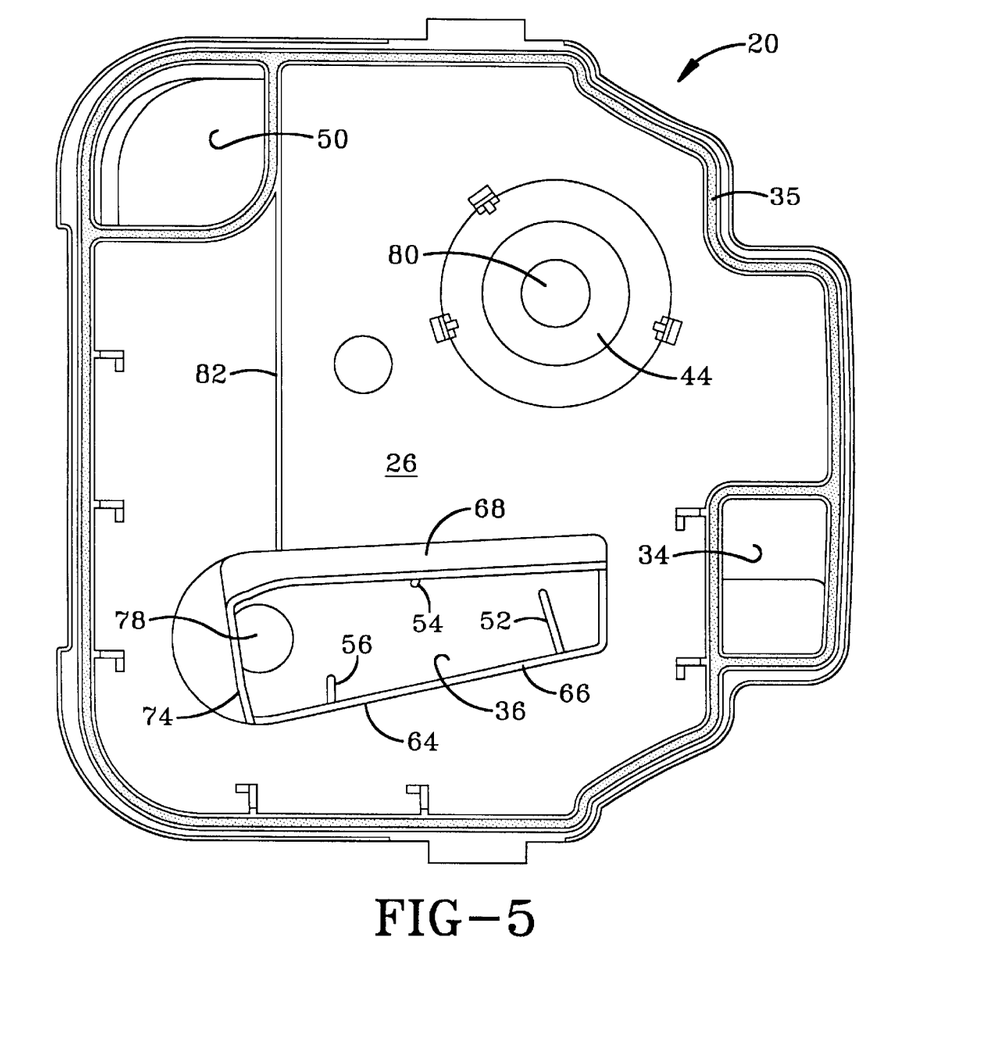
FIG. 5 is a bottom view of the recovery tank lid of FIG. 2 removed from the tank.

As best seen in FIGS. 3, 4 and 5, a peripheral wall 64 preferably extends down from a lower surface of the bottom plate 26 and surrounds the discharge opening 36. The peripheral wall 64 prevents drops of liquid that settle on the upper surface of the bottom plate 26 from passing through the discharge opening and traveling across the lower surface of the bottom plate to the outlet opening 44 and getting sucked into the motor fan assembly. Any drops passing through the discharge opening will drip off a lower edge 66 of the peripheral wall 64 into the tank 12. As seen in FIG. 4, the peripheral wall has an inclined baffle 68 extending down from its lower edge on a side of the discharge opening 36 closest to the outlet opening 44 of the recovery tank. The inclined baffle is inclined toward a side wall of the recovery tank (not shown in FIG. 4, but indicated as 70 in FIG. 6) that is farthest from the outlet opening. The inclined baffle directs liquid laden air away from the outlet opening 44 and against the side wall 70 of the tank. Directing the liquid laden away from outlet helps prevent liquid laden air from traveling directly from the discharge opening to the outlet opening. Directing the liquid laden air toward the side wall of the tank also causes liquid laden air to impinge against the sidewall, such that at least a portion of the liquid entrained in the air adheres to the inner surface of the side wall and settles in the tank. The inclined baffle on the lid is horizontally spaced from a central baffle 84 (only visible in FIG. 6) in the tank a sufficient distance to ensure that no drops of liquid exiting the discharge opening pass over the central baffle into the region of the tank near the outlet opening 44.

A lower edge 72 of a forward end wall 74 of the peripheral wall is inclined downward away from the bottom plate moving away from the outlet opening 44. Any drops adhering to the forward end wall 74 will travel down to the lowest point 76, which is the farthest point from the exit opening, and drip into the recovery tank. The forward end wall also extends down further into the tank than other portions of the peripheral wall 64, in order to direct air passing through the discharge opening down into the recovery tank. The forward end wall thus prevents the majority of the air stream A from flowing directly to the forward end of the tank and provides for better expansion of the air in the tank.

Small drip bumps or protrusions 78 and 80 (as shown in FIGS. 3 and 4) are preferably formed on the lower surface of the lid top plate 24 centrally over the exit opening 44 and the discharge opening 36. The drip bumps 78 and 80 provide drip points from which drops adhering to the lower surface of the top plate 24 may drip through the exit opening and discharge opening into the tank 12 when the suction fan is turned off.

A low rib 82 extends down from the lower surface of the bottom plate into the recovery tank. The rib 82 runs from the peripheral wall of the discharge opening, across the lid in front of the outlet opening 44, and to the far side of the lid. Drops adhering to the lower surface of the lid and traveling from the front of the lid toward the outlet opening 44 encounter the rib and drip from the lower edge of the rib into the recovery tank. The drops are thus prevented form traveling along the lower surface of the bottom plate and out the outlet opening.

Figure 6:
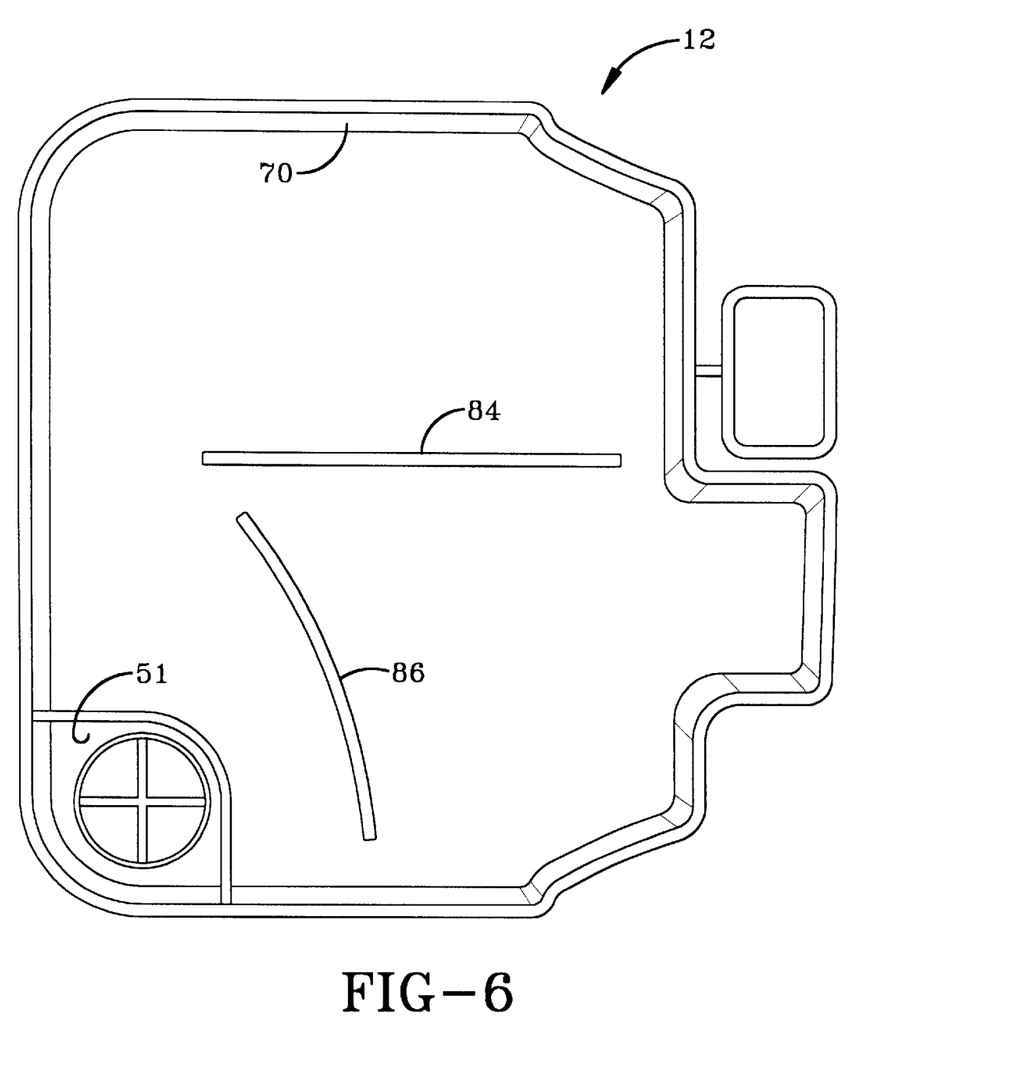
FIG. 6 is a top plan view of the recovery tank with the lid containing the separator removed therefrom.

Referring now to FIG. 6, a pair of baffles 84, 86 extend up form the bottom of the recovery tank 12. The baffles 84, 86 limit the degree of sloshing and splashing of liquid in the tank during the forward and reverse push-pull operation of the extractor in the floor cleaning mode. The baffles also serve to prevent the establishment of a "short circuited" working air flow in the tank from the discharge opening 36 directly to the exit opening 44. The air must travel around or over the baffles when traveling from the discharge opening to the outlet opening. Thus, the velocity of the air is slowed to a minimum value as it passes through the tank and the time that the working air spends within the tank is at a maximum, thereby providing for more complete liquid precipitation within the tank.

Most of the air travels from the discharge opening 36, around the front of the central baffle 84 and out the outlet opening 44. As liquid laden air travels past the rib 82 (see FIG. 5) extending down from the bottom plate, the rib causes the air to dip down and back up again. This dip in the air flow, causes liquid to drop out of the air and settle in the recovery tank.

A screen (not shown) is preferably located in the outlet duct 51 of the recovery tank 12 to filter out and prevent any lint or hair that passes through the separator from entering the motor fan assembly. The discharge opening 36 in the inlet chamber is preferably spaced forward of a rear wall of the recovery tank a distance sufficient that, when the cleaner is trundled, i.e. tilted back on its rear wheels for easy transport from one room to another, the recovered liquid in the recovery tank will never, even at maximum tank capacity, flow through the discharge opening, through the lid and into the duct work in the machine.

The mold parting line in the outlet opening 44 is preferably spaced slightly upward from the lower surface of the lid bottom plate 26. Moving the parting line up from the lower surface or corner of the outlet opening enables the lower peripheral corner of the outlet opening to be accurately and smoothly formed, such that the shutoff float smoothly (not shown) and evenly mates and seals against the exit opening. Thus, the seal required by prior art extractors between the float (not shown) and the bottom plate is eliminated.

In a preferred embodiment, the total cross-sectional area of the discharge opening 36 is preferably larger than the cross-sectional area of the suction duct 5 and the inlet opening 34, such that the flow of air and entrained liquid slows down traveling though the inlet chamber and into the tank. Slowing the air as it flows through the inlet chamber and the recovery tank provides more time for the liquid to separate from the air. It is also important that the air traveling through the discharge opening and into the recovery tank is slowed down compared to the air stream A entering the inlet chamber, in order to minimize splashing, sloshing and foaming of the liquid already recovered in the tank is created. Too much splashing, sloshing and/or foaming of the liquid in the recovery tank can cause the float to seal the outlet opening 44 prematurely and can cause liquid and or foam to pass through the outlet opening and enter the motor fan assembly. Providing a relatively large discharge opening in the bottom plate 26 not only slows the air down, but also disperses the flow of air and liquid entering the recovery tank 12 and helps decrease splashing, sloshing and foaming in the recovery tank.

It is also preferred that the exit opening 50, the exhaust duct 51 and the outlet duct 7 all have cross-sectional areas that are greater than the cross-sectional area of the suction duct 5, so that they do not restrict the air flow through the separator. It will be appreciated that the exact size of the discharge opening and the suction ducts may vary without affecting the effectiveness of the lid as a separator. The size of the discharge opening required for effective separation is dependent on the size of the inlet chamber, size of the recovery tank, quantity of liquid entrained in the air, flow rate of liquid and air, arrangement and shape of the inlet chamber and recovery tank, and many other factors. The most effective size shape and location of the discharge opening for any given system is determined experimentally.

The lid 20, or at least the lid top plate 24, is preferably formed of transparent material so that the operator may visually observe the flow of soiled liquid extracted from the surface being cleaned as the soiled liquid flows through the lid. Likewise, it is preferable to form the recovery tank 12 out of clear or translucent material so that the operator may visually observe the level of recovered liquid in the tank.

The foregoing description is of a preferred embodiment of an air and liquid separator formed by a recovery tank having a hollow removable lid. However, it can be appreciated that the portion of the separator according to the present invention that is located in the lid does not have to be a removable lid of a recovery tank. The portion of the separator contained in the lid may alternatively be incorporated either as an integral or as a removable part of the recovery tank, or either as an integral or removable part of the carpet extractor or other floor care appliance that is separate from, but cooperates with the recovery tank as described herein. Furthermore, the exhaust or exit opening 44 may alternatively be provided in an exterior wall of the recovery tank 12, rather than being provided in the lid bottom plate.

Although the present invention has been described in connection with a preferred embodiment, many variations and modifications will become apparent to those skilled in the art upon reviewing the preceding description of a preferred embodiment and the attached drawings. It is intended that the present invention include all such modifications and be limited not by the specific disclosure herein.

What is claimed is:

1. An air and liquid separator comprising:
   a separation chamber formed between a pair of side walls, a top wall and a bottom wall, said separation chamber having an input end for receiving a stream of liquid-laden air and an outlet end;
   a first rib extending inwardly from one of the side walls of the separation chamber adjacent to the outlet end thereof; and
   wherein the first rib and an inwardly extending wall form a corner in the one of the side walls of the separation chamber for receiving a portion of the liquid-laden air.

2. A The air and liquid separator defined in claim 1 in which an outlet opening is formed in the outlet end of the separation chamber.

3. The air and liquid separator defined in claim 2 in which at least a portion of the first rib extends over the outlet opening.

4. The air and liquid separator defined in claim 2 further including a second rib positioned within the separation chamber between the first rib and the input end.

5. The air and liquid separator defined in claim 4 in which the second rib extends angularly relative to the stream of liquid-laden air.

6. The air and liquid separator defined in claim 4 further including a third rib positioned within the separation chamber between the first rib and the second rib.

7. The air and liquid separator defined in claim 6 in which the third rib extends angularly relative to the stream of liquid-laden air.

8. An air and liquid separator comprising:
   a separation chamber formed between a pair of side walls, a top wall and a
   bottom wall, said separation chamber having an input end for receiving a stream of liquid-laden air and an outlet end;
   a first rib extending inwardly from one of the side walls of the separation chamber adjacent to the outlet end thereof;
   an outlet opening formed in the outlet end of the separation chamber; and
   a baffle extending downwardly from a peripheral edge of the outlet opening for directing a portion of the liquid separated within the separation chamber.

9. The air and liquid separator defined in claim 8 in which at least a portion of the first rib extends over the outlet opening.

10. The air and liquid separator defined in claim 8 further including a second rib positioned within the separation chamber between the first rib and the input end.

11. The air and liquid separator defined in claim 10 in which the second rib extends angularly relative to the stream of liquid-laden air.

12. The air and liquid separator defined in claim 10 further including a third rib positioned within the separation chamber between the first rib and the second rib.

13. The air and liquid separator defined in claim 12 in which the third rib extends angularly relative to the stream of liquid-laden air.

14. An air and liquid separator comprising:
   a separation chamber formed between a pair of side walls, a top wall and a bottom wall, said separation chamber having an input end for receiving a stream of liquid-laden air and an outlet end;
   a first rib extending inwardly from one of the side walls of the separation chamber adjacent to the outlet end thereof;
   an outlet opening formed in the outlet end of the separation chamber;
   a second rib positioned within the separation chamber between the first rib and the input end;
   a third rib positioned within the separation chamber between the first rib and the second rib; and
   at least a portion of the second and third ribs extends over the outlet opening.

15. An air and liquid separator comprising:
   an elongated separation chamber formed between a pair of side walls, a top wall and a bottom wall, said separation chamber having an input end for receiving a stream of liquid-laden air and an outlet end;
   an arcuate wall formed at the outlet end of the separation chamber;
   a first rib extending inwardly from one of the side walls of the separation chamber adjacent to the outlet end thereof; and
   wherein the first rib and an inwardly extending wall form a corner in the one of the side walls of the separation chamber for receiving a portion of the liquid-laden air.

16. The air and liquid separator defined in claim 15 in which an outlet opening is formed in the outlet end of the separation chamber.

17. The air and liquid separator defined in claim 16 in which at least a portion of the first rib extends over the outlet opening.

18. The air and liquid separator defined in claim 16 further including a second rib positioned within the separation chamber between the first rib and the input end.

19. The air and liquid separator defined in claim 18 in which the second rib extends angularly relative to the stream of liquid-laden air.

20. The air and liquid separator defined in claim 18 further including a third rib positioned within the separation chamber between the first rib and the second rib.

21. The air and liquid separator defined in claim 20 in which the third rib extends angularly relative to the stream of liquid-laden air.

22. An air and liquid separator comprising:
   an elongated separation chamber formed between a pair of side walls, a top wall and a bottom wall, said separation chamber having an input end for receiving a stream of liquid-laden air and an outlet end;
   an arcuate wall formed at the outlet end of the separation chamber;
   a first rib extending inwardly from one of the side walls of the separation chamber adjacent to the outlet end thereof;
   an outlet opening formed in the outlet end of the separation chamber; and
   a baffle extending downwardly from a peripheral edge of the outlet opening for directing a portion of the liquid separated within the separation chamber.

23. An air and liquid separator comprising:
   an elongated separation chamber formed between a pair of side walls, a top wall and a bottom wall, said separation chamber having an input end for receiving a stream of liquid-laden air and an outlet end;
   an arcuate wall formed at the outlet end of the separation chamber;
   a first rib extending inwardly from one of the side walls of the separation chamber adjacent to the outlet end thereof;
   an outlet opening formed in the outlet end of the separation chamber;
   a second rib positioned within the separation chamber between the first rib and the input end;
   a third rib positioned within the separation chamber between the first rib and the second rib; and
   at least a portion of the second and third ribs extends over the outlet opening.

24. An air and liquid separator comprising:
   an elongated separation chamber formed between a pair of side walls, a top wall and a bottom wall, said separation chamber having an input end for receiving a stream of liquid-laden air and an outlet end;
   an arcuate wall formed at the outlet end of the separation chamber;
   a first rib extending inwardly from one of the side walls of the separation chamber adjacent to the outlet end thereof;
   an outlet opening formed in the outlet end of the separation chamber;
   a second rib positioned within the separation chamber between the first rib and the input end;
   a third rib positioned within the separation chamber between the first rib and the second rib; and
   the second and third ribs deflect the stream of liquid-laden air into one side of the first rib and the arcuate wall deflects the stream of liquid-laden air into the other side of the first rib.

25. A separator for separating a liquid from a stream of liquid-laden air, said separator comprising:
   a separation chamber formed between a pair of side walls and having an inlet opening through which the stream of liquid-laden air enters said separation chamber and an outlet opening;
   a first rib extending inwardly from one of the side walls of the separation chamber adjacent to the outlet end thereof;
   an outlet opening formed in the outlet end of the separation chamber;
   a second rib positioned within the separation chamber between the first rib and the input end;
   a third rib positioned within the separation chamber between the first rib and the second rib; and
   wherein the second and third ribs have a height which is less than the height of the first rib.

26. An air and liquid separator comprising:
   an elongated separation chamber formed between a pair of side walls, a top wall and a bottom wall, said separation chamber having an input end for receiving a stream of liquid-laden air and an outlet end;

an arcuate wall formed at the outlet end of the separation chamber;

a first rib extending inwardly from one of the side walls of the separation chamber adjacent to the outlet end thereof;

an outlet opening formed in the outlet end of the separation chamber;

a second rib positioned within the separation chamber between the first rib and the input end;

a third rib positioned within the separation chamber between the first rib and the second rib; and the second and third ribs deflect the stream of liquid-laden air into one side of the first rib and the arcuate wall deflects the stream of liquid-laden air into the other side of the first rib.

* * * * *